United States Patent [19]

Davidian

[11] Patent Number: 4,953,057
[45] Date of Patent: Aug. 28, 1990

[54] VARIABLE CAPACITOR AND METHOD OF MAKING SAME

[76] Inventor: James L. Davidian, 6800 Rolling Hills Dr., Riverside, Calif. 92505

[21] Appl. No.: 248,609

[22] Filed: Sep. 26, 1988

[51] Int. Cl.⁵ .......................... H01G 5/02; H01G 7/00
[52] U.S. Cl. ..................................... 361/279; 29/25.42
[58] Field of Search .............. 361/279, 326, 295, 296, 361/297; 29/25.42

[56] References Cited

U.S. PATENT DOCUMENTS

| | | | |
|---|---|---|---|
| 2,930,952 | 3/1960 | Glauber | 361/279 |
| 3,213,340 | 10/1965 | Robertson | 361/279 X |
| 3,284,682 | 11/1966 | Lippman | 361/279 |
| 3,495,142 | 2/1970 | Herrgen et al. | 361/279 |
| 3,700,983 | 10/1972 | Goetzl | 361/279 |
| 4,002,957 | 1/1977 | Weisbrod | 361/279 |

*Primary Examiner*—Donald A. Griffin
*Attorney, Agent, or Firm*—John H. Crowe

[57] ABSTRACT

A variable capacitor formed of two flexible interleaved films, each having a dielectric layer and a superposed electrically conductive layer. The films are coiled about an axis in sliding contact with each other and are movable axially relative to each other to vary the capacitance.

6 Claims, 1 Drawing Sheet

VARIABLE CAPACITOR AND METHOD OF MAKING SAME

BACKGROUND OF THE INVENTION

1. Field of the Invention

This invention relates to electrical capacitors and has particular reference to low cost, relatively small variable or adjustable capacitors.

2. Description of the Prior Art

As is well known, the capacitance value of a capacitor is proportional to the area of the conductor plates and inversely proportional to the thickness of the dielectric material therein.

Heretofore, fixed capacitors of relatively high capacitance value have been formed of a thin plastic or paper dielectric material on which a thin layer of a conductive material is bonded. Two or more such films are interleaved and wrapped in a coil to form the capacitor. In view of this form of construction, such capacitors can be made into small or miniature sizes.

On the other hand, variable capacitors have generally been constructed of conductor plates or elements which are movable relative to each other and separated to receive a suitable dielectric fluid, such as air or other gaseous or liquid substance, there-between. Since the conductor elements must be separated, they must be made rigid and accurately and precisely spaced. Also, air and other fluid dielectrics have relatively low breakdown voltage characteristics, requiring a relatively large spacing between the conductor elements. Thus, such variable capacitors are comparatively bulky, heavy and expensive to manufacture and cannot generally be made in very small or miniature sizes. Furthermore, in many cases, elaborate sealing means must be provided to prevent contamination or dilution of the gaseous or liquid dielectric by the exterior environment which could cause eventual malfunction or breakdown of the capacitor.

Various attempts have been made to overcome the above-noted disadvantages of prior variable capacitors. For example, U.S. Pat. No. 3,284,682 issued to H. E. Lippman on Nov. 8, 1966, discloses a variable capacitor in which rigid plates are spirally formed and interleaved with each other, with defined spacing therebetween to receive a dielectric gas such as air or the like. The plates are adjusted axially relative to each other to vary the capacitance. In this case, the plates and other operating parts must be made and assembled with a high degree of precision and accuracy and the conductor plates must be precisely spaced to maintain consistent results and to prevent breakdown of the dielectric which might otherwise occur if the distance between the plates is allowed to vary. Thus, the resulting capacitor tends to become relatively large and expensive to manufacture and is subject to malfunction if wear should occur in the operating parts.

SUMMARY OF THE INVENTION

I have discovered that an inexpensive, compact and reliable variable capacitor having a relatively high degree of capacitance can be formed by providing a pair of very thin interleaved flexible films of a suitable dielectric plastic or the like material having a superposed conductive layer of metal or the like on one surface. Such films are coiled in spiral form and are axially adjustable in sliding contact with and relative to each other. Because of the relatively high dielectric breakdown strength of plastic or the like films, such as polyethylene terphthalate (available commercially as Mylar, an E. I. Du Pont trademark), polycarbonate, polypropylene, etc., films, the film may be formed of a thickness considerably less than the thickness of the air gap between the conductive plates of any previously known capacitor. I have further discovered that when the interleaved films are coiled into a relatively small diameter and the coils are supported along their respective edges, they can be made extremely thin, yet rigid enough to permit relative axial sliding movement there-between. For example, plastic films on the order of 0.005 to 0.010 of an inch thick, which are normally highly flexible and structurally limp, become sufficiently rigid, when so formed, to permit sliding interengagement and the development of a high degree of capacitance.

It is therefore a principal object of this invention to provide a variable capacitor of relatively high capacitance.

Another object is to provide a variable capacitor which is simple and inexpensive to manufacture and assemble.

Another object is to provide a variable capacitor which is not dependent upon air or other gaseous or liquid fluid as a dielectric.

A further object is to provide a variable capacitor which can be manufactured in miniature, as well as in larger sizes, and has relatively high capacitance capability.

A still further object is to provide such a variable capacitor which can be readily shielded to prevent the emanation of electromagnetic radiation therefrom and/or sealed to protect its interior from environmental contamination.

Still another object of the invention is to provide such a variable capacitor capable of precise adjustment of capacity setting through multi-turn movement of one conductor relative to the other.

BRIEF DESCRIPTION OF THE DRAWING

The manner in which the above and other objects of the invention are accomplished will be readily understood by reference to the following description considered in conjunction with the accompanying drawing, wherein.

DESCRIPTION OF THE PREFERRED EMBODIMENT

Figure 1:
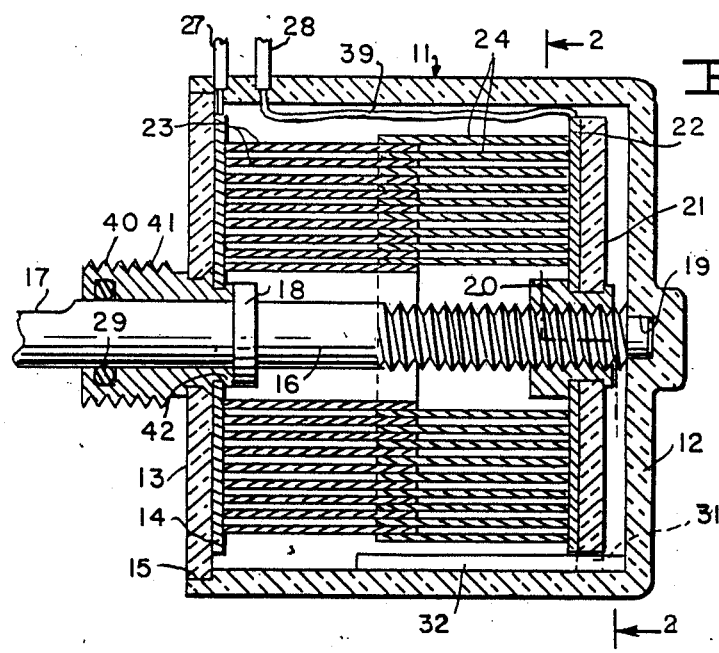
FIG. 1 is an enlarged longitudinal sectional view of a variable capacitor embodying a preferred form of the invention.

While this invention is susceptible to embodiment in many different forms, there is shown in the drawing and will be described herein a particular embodiment thereof, with the understanding that the present disclosure is to be considered as an exemplification of the principles of the invention and is not intended to limit the invention to that embodiment. The scope of the invention will be limited only by the language of the appended claims.

Referring now to the drawing, the capacitor comprises a cylindrical housing 11 of rigid material, such as plastic, or ceramic, having an end wall 12 formed integrally therewith. A circular wall plate 13 preferably of electrically insulating material, having a circular electrically conductive plate 14 suitably secured thereto, is fitted within a counterbore 15 formed in the open end of the housing 11. The wall plate 13 may be secured in the counterbore by a suitable adhesive. Alternatively the end plate 13 can be secured to the end of housing 11 or within its inner cylindrical surface.

A bearing hub 40 is suitably secured to the wall plate 13 and forms a bearing for one end of a screw threaded shaft 16. The latter may be of electrically insulating material and has a flattened end section 17 protruding from the wall plate 13 to receive a knob (not shown) or other device for rotating the shaft. A flange 18 formed on the shaft bears against an inward projection 42 of the hub 40 to prevent outward axial movement of the shaft. The opposite end of the shaft 16 has a reduced diameter bearing journal thereon rotatably mounted in a bearing 19 formed in the end wall 12 of the housing. A sealing ring 29 of rubber or the like may be fitted in an annular groove in the bearing hub 40 in engagement with the shaft 16 to hermetically seal the interior of the housing from the exterior environment.

A threaded bearing bushing 20 is threadedly engaged with the threaded portion of the shaft 16 and has secured to it a rigid disc 21 of electrically insulating material to which is suitably secured a plate 22 of electrically conductive material.

Figure 3:
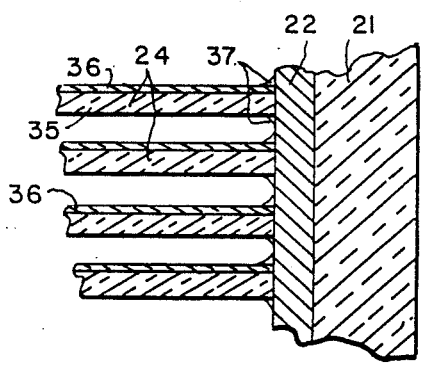
FIG. 3 is a greatly enlarged fragmentary sectional view taken along line 3—3 of FIG. 2.
Figure 2:
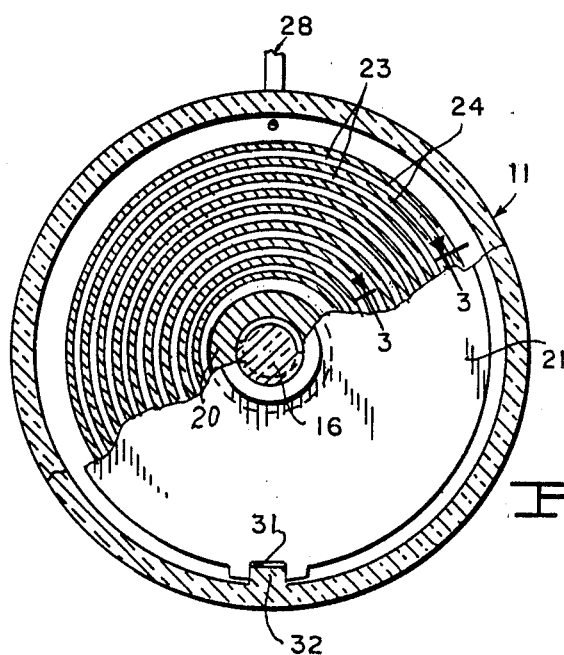
FIG. 2 is a transverse sectional view taken substantially long line 2—2 of FIG. 1.

Interleaved films or plates 23 and 24 are coiled in spiral form and located about the axis of shaft 16 in sliding contact with each other. The films are each formed of a thin dielectric base 35 (FIG. 3), such as Mylar, on one surface of which a thin layer 36 of conductive material, such as aluminum, is bonded, plated, sputtered or otherwise applied.

The right hand edges of the coils of film 24 are secured, preferably by an electrically conductive adhesive 37, to the plate 22, thus electrically connecting the layer 36 to the plate 22. Likewise, the left hand edges of the coils of film 23 are secured by a suitable conductive adhesive (not shown) to the conductor plate 14.

Although the films 23 and 24 are relatively thin, and are therefore highly flexible and may to some extent be normally limp, when coiled in interleaved fashion and arranged in sliding relation with each other they become sufficiently rigid to permit relative axial sliding movement therebetween.

An electric terminal 27 is anchored in the wall of the housing 11 and is electrically connected to the plate 14. Alternatively, the terminal 27 could be integral with plate 14 within the scope of this invention. A second terminal 28 is also anchored in the housing wall and is connected by a flexible conductor 39 to the conductor plate 22.

Means are provided to prevent turning of the plate 21 while being moved along the length of the housing 11 by rotation of the shaft 16, and for this purpose, a notch 31 is formed in the plate 21 which slidably embraces a spline 32 extending lengthwise of the housing 11 and integral therewith.

The hub 40 is preferably formed with screw threads 41 thereon for mounting in a hole in a panel or the like (not shown), with the flattened portion of the shaft extending through the panel.

According to the invention, the films 23 and 24 are preferably assembled on their respective plates by coiling the same in interleaved and snug fitting engagement on a suitable arbor (not shown), then applying a suitable conductive adhesive such as shown at 37, between the right hand edges of the coils of film 24 and conductor plate 22, and between the left hand edges of the coils of film 23 and conductor plate 14, and then holding the films in engagement with their respective conductor plates until suitably bonded. Other forms of bonding, such as heat welding, may also be used.

From the above it will be seen that the device of the present invention results in an inexpensive, lightweight capacitor which can be manufactured in miniature as well as larger sizes, is highly reliable, does not require precise and accurate manufacturing techniques, provides a large amount of capacitance and is adjustable through a wide range of capacitance values.

I claim:

1. A variable capacitor comprising:
   a pair of thin flexible interleaved films, each of said films being formed of a dielectric layer and a superposed electrically conductive layer;
   said films being coiled in a spiral about a common axis in sliding contact with each other;
   a first conductor element electrically connected to one of said films along a side edge of said film;
   a second conductor element electrically connected to the other film along a side edge of said other film; and
   means for longitudinally adjusting one of said conductor elements relative to the other along said axis.

2. A variable capacitor as defined in claim 1 wherein the conductor elements maintain said films in sliding contact during the relative movement therebetween.

3. A variable capacitor as defined in claim 1 wherein the longitudinally adjusting means comprises a screw-threaded shaft;
   bearing means supporting said shaft for rotation about said axis;
   means mounting said first conductor element on said shaft in screw-threaded relation for movement of the conductor element along said axis; and
   means supporting said second conductor element in fixed position.

4. A variable capacitor as defined in claim 3 including means for preventing rotation of said first conductor element upon movement thereof along said shaft.

5. A variable capacitor comprising:
   a housing having a pair of spaced end walls and an inner surface,
   a shaft rotatably supported by both of said end walls,
   a first slidably mounted electrically conductive plate,
   means mounting said first electrically conductive plate on said shaft in screw-threaded relationship with said shaft,
   a second electrically conductive plate carried by the other of said end walls,
   a pair of flexible interleaved films in said housing, each of said films being formed of a dielectric layer and a superposed electrically conductive layer,
   said films being coiled in a spiral about the axis of said shaft,
   the electrically conductive plates serving to support respective ones of said films in sliding contact, and
   means on the housing inner surface for facilitating sliding movement of said first electrically insulating plate for preventing rotation of said first electrically conductive plate relative to said housing upon movement of that plate along the length of said shaft upon rotation of the latter.

6. The method of forming a variable capacitor which comprises;

forming a pair of thin flexible interleaved films, each of said films having a dielectric layer and a superposed electrically conductive layer;

coiling said films in a spiral about an axis in sliding engagement with each other;

providing a pair of electrically conductive elements;

securing one of said films along a side edge thereof to one of said elements while coiled in said spiral;

securing the other of said films along a side edge thereof to the other of said elements while coiled in said spiral; and providing means for adjusting said elements toward and away from each other.

* * * * *